US008473483B2

(12) United States Patent
Teletia et al.

(10) Patent No.: US 8,473,483 B2
(45) Date of Patent: Jun. 25, 2013

(54) PERFORMING PARALLEL JOINS ON DISTRIBUTED DATABASE DATA

(75) Inventors: Nikhil Teletia, Madison, WI (US); Alan Dale Halverson, Verona, WI (US); José A. Blakeley, Redmond, WA (US); Milind Madhukar Joshi, Redmond, WA (US); Jose Aguilar Saborit, Dana Point, CA (US)

(73) Assignee: Microsoft Corporation, Redmond, WA (US)

( * ) Notice: Subject to any disclaimer, the term of this patent is extended or adjusted under 35 U.S.C. 154(b) by 162 days.

(21) Appl. No.: 13/154,911

(22) Filed: Jun. 7, 2011

(65) Prior Publication Data

US 2012/0317093 A1     Dec. 13, 2012

(51) Int. Cl.
*G06F 17/30* (2006.01)

(52) U.S. Cl.
USPC .......................................... 707/714; 707/764

(58) Field of Classification Search
USPC ................................................ 707/714, 764
See application file for complete search history.

(56) References Cited

U.S. PATENT DOCUMENTS

| 6,112,198 | A   | * | 8/2000  | Lohman et al. ........ 707/999.003 |
| 6,496,819 | B1  |   | 12/2002 | Bello |
| 6,625,593 | B1  |   | 9/2003  | Leung |
| 7,467,128 | B2  |   | 12/2008 | Larson |
| 7,512,625 | B2  |   | 3/2009  | Lariba-Pey |
| 2006/0117036 | A1 | * | 6/2006 | Cruanes et al. ................ 707/100 |
| 2006/0218123 | A1 | * | 9/2006 | Chowdhuri et al. .............. 707/2 |
| 2006/0224551 | A1 | * | 10/2006 | Lariba-Pey et al. .............. 707/1 |
| 2007/0219951 | A1 |   | 9/2007 | Ahmed |

OTHER PUBLICATIONS

Kang, Myoung-Soo, et al., "Deploying Parallel Spatial Join Algorithm for Network Environment", Nov. 2002, pp. 177-181.
Shahabi, Cyrus, et al., "Efficiently Querying Moving Objects with Pre-defined Paths in a Distributed Environment", Nov. 2001, 7 pages.
Michael, Loizos, et al., "Improving Distributed Join Efficiency with Extended Bloom Filter Operations", May 2007, 8 pages.
Bernstein, Philip A., et al., "Using Semi-Joins to Solve Relational Queries", Journal of the Association for Computing Machinery, vol. 28, No. 1, Jan. 1981, pp. 25-40.
Bernstein, Philip A., et al., Query Processing in a System for Distributed Databases (SDD-1), ACM Transactions on Database Systems, vol. 6, No. 4, Dec. 1981, pp. 602-625.
Rothnie, Jr., J.B., et al., Introduction to a System for Distributed Databases (SDD-1); ACM Transactions on Database Systems, vol. 5, No. 1, Mar. 1980, pp. 1-17.
Li, Zhe, et al., "Better Semijoins Using Tuple Bit-Vectors", Apr. 10, 1994, 13 pages.

* cited by examiner

*Primary Examiner* — Khanh Pham
(74) *Attorney, Agent, or Firm* — Workman Nydegger (57) ABSTRACT

The present invention extends to methods, systems, and computer program products for performing parallel joins on distributed database data. Embodiments of the invention include a phased semi-join reduction strategy using replication and shuffle operations to join a first and a second data source. A filter building phase uses replication and pushes down a "Distinct" (e.g., SQL) operator to produce a list of join keys for the first data source (one side of the join). A shuffle phase for the second data source is modified to join to the key list produced in the first phase as a row filtering mechanism. A join phase then joins the first and second data sources.

20 Claims, 5 Drawing Sheets

)
PERFORMING PARALLEL JOINS ON DISTRIBUTED DATABASE DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, joins are performed between distributed data sources, such as, for example, different parts of a table stored at different computer systems. If the distributed data sources are not join compatible (i.e., the distribution columns are not a subset of the columns being used for the join), results from one or both of the data sources are shuffled to solve the join. For example, rows of data can be moved between data sources so that distribution columns are a subset of columns being used to solve the join.

Any predicates on a data source that is to be shuffled can be pushed down prior to the shuffle operation. However, any predicate on a data source that is not to be shuffled typically cannot be used to restrict the amount of data. As such, the amounts of data shuffled to make distributed data source join compatible can be relatively large.

BRIEF SUMMARY

The present invention extends to methods, systems, and computer program products for performing parallel joins on distributed database data. A distributed database system stores a first table and a second table. The first and second tables have a join attribute column. The distributed database system includes a first node and a second node. The first node and second node each store a portion of the first table and a portion of the second table. Accordingly, the first and second tables are distributed across the first and second nodes.

In some embodiments, a query is performed over the first and second tables. The distributed database system receives a query for joining together selected items from the first table with selected items from the second table. The query includes a first query term and a second query term. The first query term is for selecting corresponding rows from the first and second tables that have a specified relationship based on values in a join attribute column. The second query term is for filtering rows based on column values in a second column of the first table.

The first node determines that a first portion of the first table stored at the first node and a first portion of the second table stored at the first node are join incompatible. The first node sends first replicated column values from the join attribute column to the second node. The first replicated column values are selected from the first portion of the first table in accordance with the second query term. The first node receives second replicated column values from the join attribute column from the second node. The second replicated column values are selected from a second portion of the first table stored at the second node in accordance with the second query term.

The first node combines the first replicated column values and the second replicated column values into combined replicated column values. The combined replicated column values contain both the first replicated column values and the second replicated column values. The first node joins the combined replicated column values with rows from the first portion of the second table to select rows from the second table that satisfy the first query term.

The first node moves one or more of the selected rows to the second node for join compatibility with the second portion of the first table. The first node retains one or more of the selected rows at the first node. The first node receives one or further selected rows from the second node for join compatibility with the first portion of the first table. The one or more further selected rows having been selected from the second portion of the second table.

The first node combines the one or more retained selected rows with the one or further selected rows into combined selected rows that are join compatible with the first portion of the first table. The combined selected rows are joined with the first portion of the first table to partially satisfy the query.

The second node can perform similar operations to also partially satisfy the query. Results from the first and second nodes can be combined.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for performing parallel joins of distributed database data. A distributed database system stores a first table and a second table. The first and second tables have a join attribute column. The distributed database system includes a first node and a second node. The first node and second node each store a portion of the first table and a portion of the second table. Accordingly, the first and second tables are distributed across the first and second nodes.

In some embodiments, a query is performed over the first and second tables. The distributed database system receives a query for joining together selected items from the first table with selected items from the second table. The query includes a first query term and a second query term. The first query term is for selecting corresponding rows from the first and second tables that have a specified relationship based on values in a join attribute column. The second query term is for filtering rows based on column values in a second column of the first table.

The first node determines that a first portion of the first table stored at the first node and a first portion of the second table stored at the first node are join incompatible. The first node sends first replicated column values from the join attribute column to the second node. The first replicated column values are selected from the first portion of the first table in accordance with the second query term. The first node receives second replicated column values from the join attribute column from the second node. The second replicated column values are selected from a second portion of the first table stored at the second node in accordance with the second query term.

The first node combines the first replicated column values and the second replicated column values into combined replicated column values. The combined replicated column values contain both the first replicated column values and the second replicated column values. The first node joins the combined replicated column values with rows from the first portion of the second table to select rows from the second table that satisfy the first query term.

The first node moves one or more of the selected rows to the second node for join compatibility with the second portion of the first table. The first node retains one or more of the selected rows at the first node. The first node receives one or further selected rows from the second node for join compatibility with the first portion of the first table. The one or more further selected rows having been selected from the second portion of the second table.

The first node combines the one or more retained selected rows with the one or further selected rows into combined selected rows that are join compatible with the first portion of the first table. The combined selected rows are joined with the first portion of the first table to partially satisfy the query.

The second node can perform similar operations to also partially satisfy the query. Results from the first and second nodes can be combined.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, a "semi-join" is defined as an operator (at times represented by the symbol "⋉") that takes two relations and then projects back on the domains of one of the relations. For example, given the relations R and S, the semi join operation, or R ⋉ S can project back on the domains of relation R. That is, it retrieves those tuples in R that join to some tuple in S. Alternately, a semi join can be viewed as restricting R by values that appear in S's join domain. Thus, the result of a semi-join can be the set of tuples in R for which there is a tuple in S that is equal on their join attribute names. For example, if

| Department | |
|---|---|
| DeptName | Manager |
| Sales | Harriet |
| Production | Charles |

| Employee | | |
|---|---|---|
| Name | EmpID | DeptName |
| Harry | 3415 | Finance |
| Sally | 2241 | Sales |
| George | 3401 | Finance |
| Harriet | 2202 | Production |

Then Employee ⋉ Department is:

| Name | EmpID | DeptName |
|---|---|---|
| Sally | 2241 | Sales |
| Harriet | 2202 | Production |

That is, the semi-join result contains rows from Employee that have a DeptName included in Department.

In general, Distributed Database Management System ("DBMS") embodiments facilitate the join of two "join incompatible" tables R and S using a semi join reduction algorithm. A query including an inner relation on table R and an outer relation on table S is received. In a filter building phase, a filter is built on the outer relation to table S. The filter is replicated across all nodes containing fragments of table R. In a filter probing phase, the filter is applied to R. Tuples of R are discarded based on the filter to produce R'. Tuples in R' (the join columns) are then shuffled based on the join attribute of R. In a final join phase, subsequent to shuffling R', R' is joined with S.

A semi join reduction algorithm can be implemented using data movement operations (e.g., Data Movement Services ("DMS") primitives), such as, for example, replication and shuffle, in combination with SQL primitives such as, for example, DISTINCT and INNER JOIN. A replication operator can be used to copy a distributed table (i.e., a table with fragments at different nodes) into a replicated table (i.e., a table that contains all of the fragments). A shuffle operation can be used to copy data into a distributed table with a different distribution column set. A DISTINCT primitive can be used to eliminate retrieving duplicate data.

Figure 1:
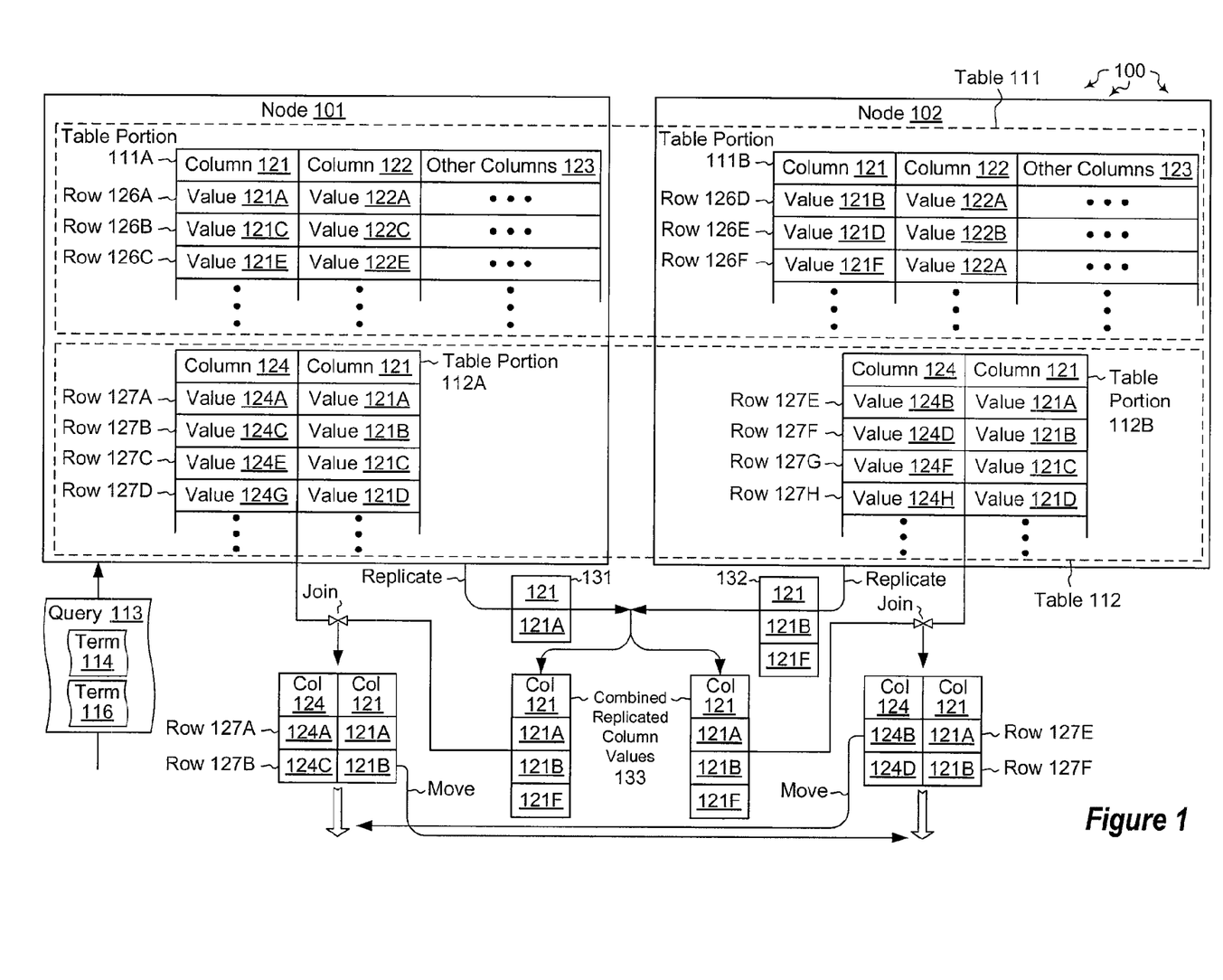
FIG. 1 illustrates an example computer architecture that facilitates performing parallel joins of distributed database data.

FIG. 1 illustrates an example computer architecture 100 that facilitates using performing parallel joins on distributed database data. Referring to FIG. 1, computer architecture 100 includes nodes 101 and 102. Nodes 101 and 102 can be connected to one another over (or be part of) a network, such as, for example, a Local Area Network ("LAN"), a Wide Area Network ("WAN"), and even the Internet. Accordingly, nodes 101 and 102 as well as any other connected nodes and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, computer architecture 100 can represent a distributed database system. For example, as depicted in computer architecture 100, tables 111 and 112 (e.g., database tables) are distributed across nodes 101 and 102. Each of nodes 101 and 102 stores a portion of tables 111 and 112. Portion 111A of table 111 and portion 112A of table 112 are stored at node 101. Likewise, portion 111B of table 111 and portion 112B of table 112 are stored at node 102.

Each table can include a set of data elements (values) organized using a model of vertical columns (e.g., attribute names) and horizontal rows (e.g., attribute values). For example, table 111 has columns 121, 122, and other columns 123. Other columns 123 represent one or more other columns of data in table 111. Similarly, table 112 has columns 124 and 121. Thus, each of tables 111 and 112 can include values in column 121 (a join attribute column). Column 124 can represent a partition attribute column.

Values in column 121 can be used correlate data from other columns in tables 111 and 112 with one another. When a row in table 111 and a row in table 112 have the same value in column 121, values in other columns of the rows are related. For example, row 126A and row 127A both include the value 121A in column 121. The value of 121A indicates that other data from row 126A (e.g., value 122A and values in other columns 123) is related to other data from row 127A (e.g., value 124A).

With respect to the previously described semi join reduction algorithm, table 111 corresponds to table S and table 112 corresponds to table R The distributed database system or nodes therein can receive queries for data satisfying one or more query terms. A received query can be propagated to any node that has a portion of a table storing data relevant to the received query.

Figure 2:
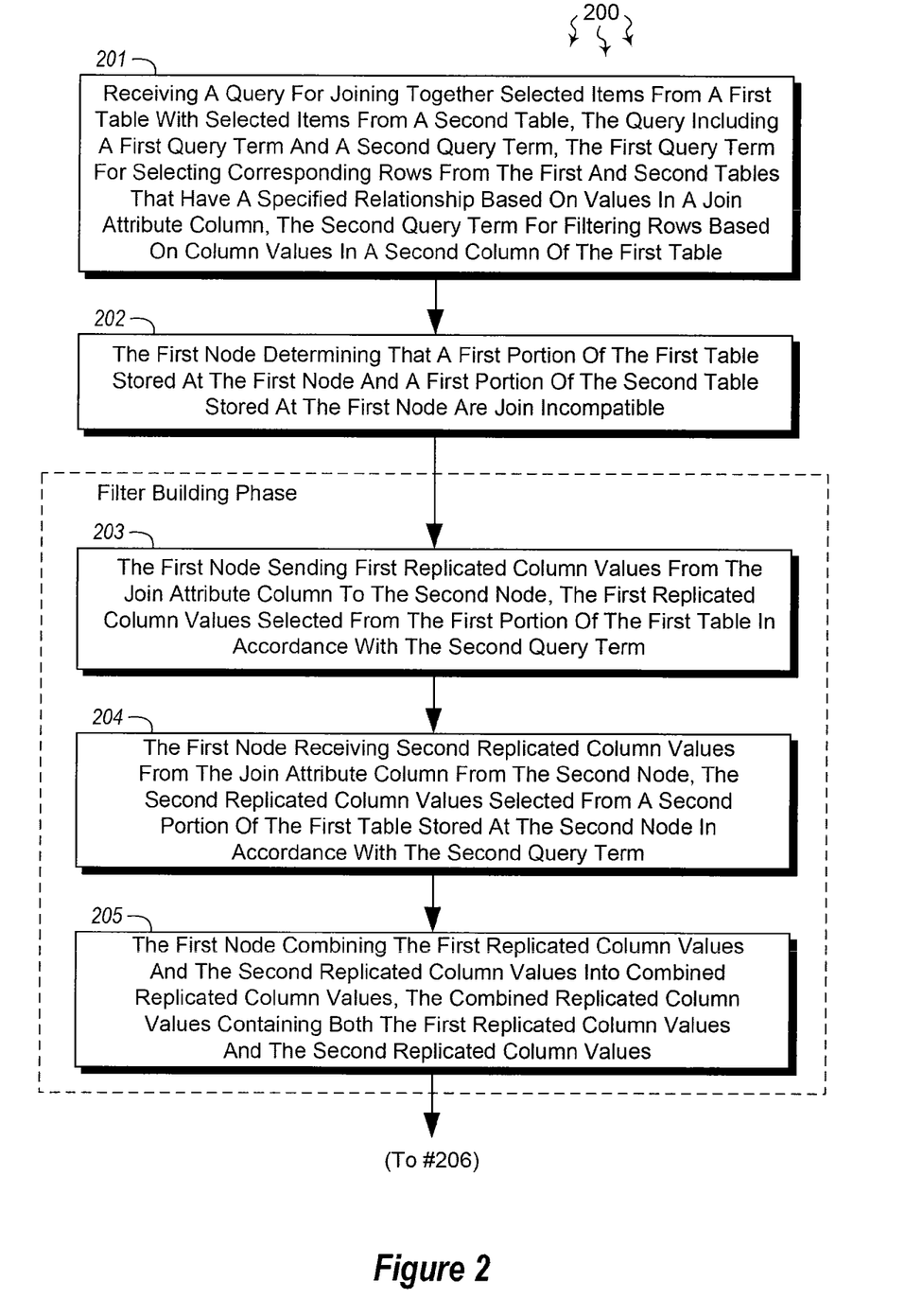
FIG. 2 illustrates a flow chart of an example method for performing a parallel joins of distributed database data.

FIG. 2 illustrates a flow chart of an example method 200 for performing a parallel joins of distributed database data. Method 200 will be described with respect to the components and data of computer architecture 100.

Method 200 includes an act of receiving a query for joining together selected items from a first table with selected items from a second table, the query including a first query term and a second query term, the first query term for selecting corresponding rows from the first and second tables that have a specified relationship based on values in the join attribute column, the second query term for filtering rows based on column values in a second column of the first table (act 201). For example, node 101 can receive query 113, including query terms 114 and 116. Query 113 can be a SQL query including one or more SQL operations. Query term 114 can indicate that rows from table 111 and rows from table 112 that have the same value in column 121 (a join attribute column) are to be joined together. Query term 116 can filter the joined rows from query term 114 to those rows that have the value 122A in column 122.

Node 101 can propagate query 113 to node 102.

Method 200 includes an act of the first node determining that a first portion of the first table stored at the first node and a first portion of the second table stored at the first node are join incompatible (act 202). For example, node 101 can determine that table portion 111A and table portion 112A are join incompatible. Join incompatibility can occur when a value in a portion of one table cannot be checked due to a portion of another table not including specified data. Table portion 111A and table portion 112A can be viewed as join incompatible because table portion 111A does not include data for checking if values 121B and 121D have value 122A in column 122 (the condition of query term 116). The data is instead contained in table portion 111B.

Similarly, node 102 can determine that table portion 111B and table portion 112B are join incompatible. Table portion 111B and table portion 112B can be viewed as join incompatible because table portion 111B does not include data for checking if values 121A and 121C have value 122A in column 122 (the condition of query term 116). The data is instead contained in table portion 111A.

Method 200 includes an act of the first node sending first replicated column values from the join attribute column to the second node, the first replicated column values selected from the first portion of the first table in accordance with the second query term (act 203). For example, node 101 can send replicated column values 131 from column 121 to node 102. Replicated column values 131 can be selected from table portion 111A in accordance with query term 116. Replicated column values 131 can include value 121A. Value 121A can be selected from table portion 111A in accordance with term query term 116. That is, value 121A is replicated and sent to node 102 since row 126A has the value 122A in column 122.

Similarly, node 102 can send replicated column values 132 from column 121 to node 102. Replicated column values 132 can be selected from table portion 111B in accordance with query term 116. Replicated column values 132 can include values 121B and 121F. Values 121B and 121F can be selected from table portion 111B in accordance with term query term 116. That is, values 121B and 122F are replicated and sent to node 101 since rows 126D and 126F have the value 122A in column 122.

Method 200 includes an act of the first node receiving second replicated column values from the join attribute column from the second node, the second replicated column values selected from a second portion of the first table stored at the second node in accordance with the second query term (act 204). For example, node 101 can receive replicated column values 132 from node 102.

Similarly, node 102 can receive replicated column values 131 from node 101.

Method 200 includes an act of the first node combining the first replicated column values and the second replicated column values into combined replicated column values, the combined replicated column values containing both the first replicated column values and the second replicated column values (act 205). For example, node 101 can combine replicated column values 131 and 132 into combined replicated column values 133. Combined replicated column values 133 contains both replicated column values 131 (i.e., value 121A) and replicated column values 132 (i.e., values 121B and 121F).

Similarly, node 102 can combine replicated column values 131 and 132 into combined replicated column values 133.

With respect to the previously described semi join algorithm, combined replicated column values 133 represent a filter that can be applied to table 112. Thus, acts 203, 204, and 205 along with similar acts at node 102 can be included in a filter building phase of the described semi join reduction algorithm.

In some embodiments, nodes send values for inclusion in a filter to a specified location within a distributed database system (e.g., to a specified node or a filter building module). The filter is built at the specified location and then replicated back to the nodes.

Method 200 includes an act of the first node joining the combined replicated column values with rows from the first portion of the second table to select rows from the second table that satisfy the first query term (act 206). For example, node 101 can join combined replicated column values 133 with table portion 112A to select rows 127A and 127B from table 112.

Similarly, node 102 can join combined replicated column values 133 with table portion 112B to select rows 127E and 127F from table 112.

Method 200 includes an act of the first node moving one or more of the selected rows to the second node for join compatibility with the second portion of the first table and retaining one or more of the selected rows at the first node (act 207). For example, node 101 can move row 127B to node 102 for join compatibility with table portion 111B. Node 101 can retain row 127A (since row 127A is join compatible with table portion 111A).

Similarly, node 102 can move row 127E to node 101 for join compatibility with table portion 111A. Node 102 can retain row 127F (since row 127F is join compatible with table portion 111B)

Method 200 includes an act of the first node receiving one or more further selected rows from the second node for join compatibility with the first portion of the first table, the one or more further selected rows selected from the second portion of the second table (act 208). For example, node 101 can receive row 127E form node 102.

Similarly, node 102 can receive row 127B from node 101.

Method 200 includes an act of the first node combining the one or more retained selected rows with the one or more further selected rows into combined selected rows that are join compatible with the first portion of the first table (act 209). For example, node 101 can combine rows 127A and 127E into combined selected rows that are join compatible with table portion 111A.

Similarly, node 102 can combine rows 127F and 127B into combined selected rows that are join compatible with table portion 111B.

With respect to the previously described semi join algorithm, rows 127A, 127B, 127E, and 127F represent R'. Thus, acts 206, 207, 208, and 209 along with similar acts at node 102 can be included in a filter probing phase of the described semi join algorithm.

Method 200 includes an act of joining the combined selected rows with the first portion of the first table to partially satisfy the query (act 210). For example, node 101 can join rows 127A and 127E with table portion 111A to generate result 191. Result 191 includes columns of data from tables 111 and 112 related based on values in column 121 and that have a specified value in column 122

Similarly, node 102 can join rows 127B and 127F with table portion 111B to generate result 192. Result 192 also includes columns of data from tables 111 and 112 related based on values in column 121 and that have a specified value in column 122.

With respect to the previously described semi join reduction algorithm, results 191 and 192 represent the results of the final join between R' and S. Thus, act 210 along with a similar act at node 102 can be included in a final join phase of the described semi-join reduction algorithm.

Figure 3:
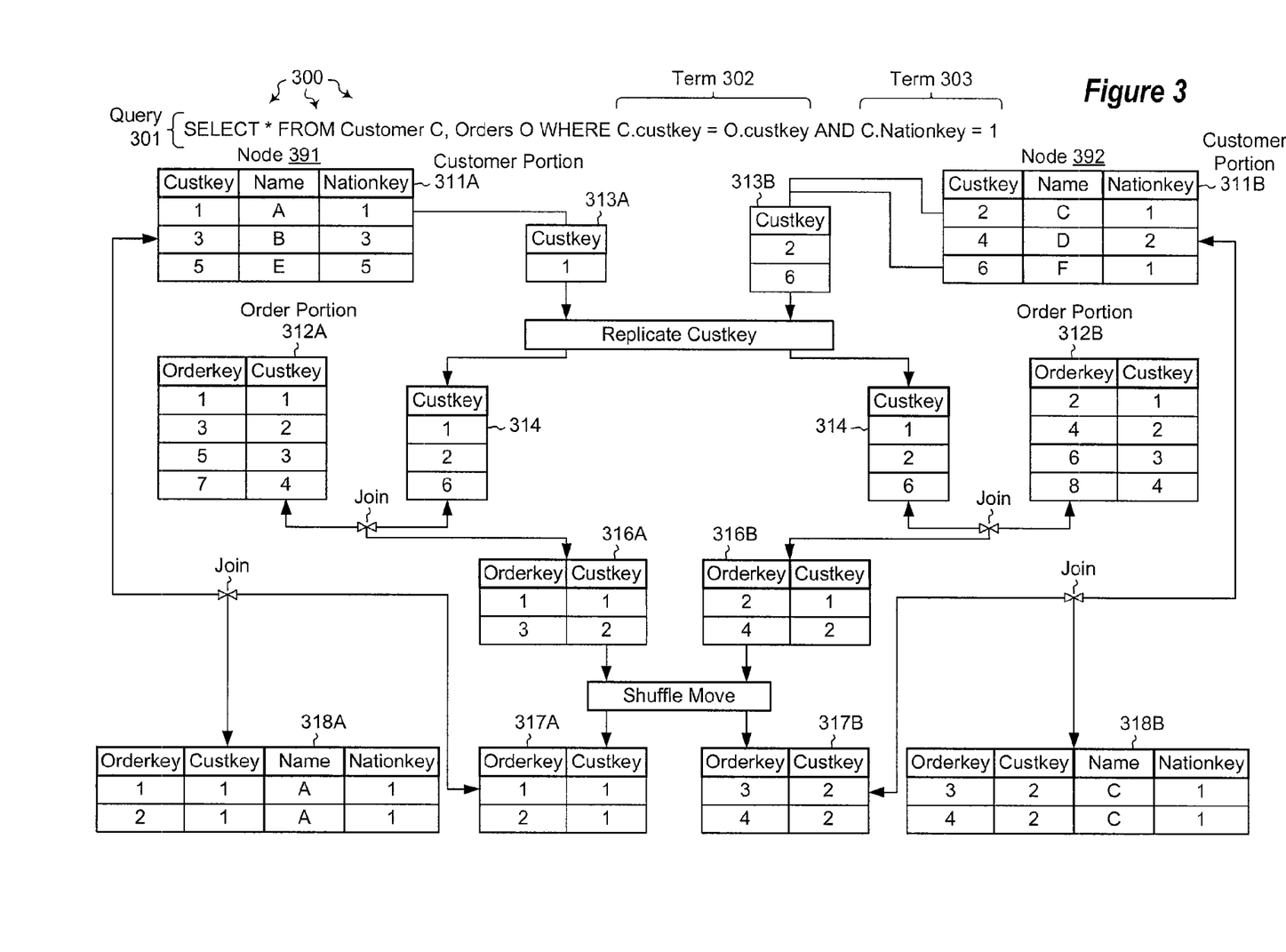
FIG. 3 illustrates an example of a distributed database system that facilitates performing parallel joins of distributed database data.

FIG. 3 illustrates an example of a distributed database system 300 that facilitates performing parallel joins of distributed database data.

As depicted, distributed database system 300 includes node 391 and node 392. Within distributed database system 300, customer portions 311A and 311B representation portions of a customer table. Similarly, order portions 312A and 312B represent portions of an order table. The distributed database system 300 can received query 301, including terms 302 and 303. Term 302 selects columns from rows in the customer table and rows in the order table that have the same value in the 'custkey' column (the join attribute column). Term 303 selects rows that have a value of '1' in the 'nationkey' column of the customer table. The orderkey column is used as the partition attribute column.

Node 391 can replicate custkeys 313A (custkey 1) and node 392 can replicate custkeys 313B (custkeys 2 and 6). Custkeys 313A and 314A can be replicated based on the replicated custkeys corresponding to rows from the customer table that have a value of '1' in the 'nationkey' column. Each of nodes 391 and 392 can combine custkeys 313A and 313B into custkeys 314.

Node 391 can join custkeys 314 with order portion 312A resulting in table 316A. Node 392 can join custkeys 314 with order portion 312B resulting in table 316B. Rows of tables 316A and 316B can be shuffled moved for join compatibly to formulate tables 317A and 317B.

Node 391 can join table 317A with customer portion 311A resulting in table 318A. Node 392 can join table 317B with customer portion 311B resulting in table 318B. Tables 318A and 318B can combined into a result for query 301.

Accordingly, embodiments of the invention include a three-phase semi-join reduction strategy using replication and shuffle operations to join a first and a second data source. A filter building phase uses replication and pushes down a "Distinct" (e.g., SQL) operator to produce a list of join keys for the first data source (one side of the join). A shuffle phase for the second data source is modified to join to the key list produced in the first phase as a row filtering mechanism. A join phase then joins the first and second data sources.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer storage device for use in a distributed database system, wherein the distributed database system stores a first table and a second table, the first and second tables having a join attribute column, the distributed database system including a first node and a second node, the first node and second node each storing a portion of the first table and a portion of the second table such that the first and second tables are distributed across the first and second nodes, the computer storage device storing computer-executable instructions which, when executed by one or more processors of the distributed database system, implement a method for performing a query over the first and second tables, wherein the method includes:

an act of receiving a query for joining together selected items from the first table with selected items from the second table, the query including a first query term and a second query term, the first query term for selecting corresponding rows from the first and second tables that have a specified relationship based on values in the join attribute column, the second query term for filtering rows based on column values in a second column of the first table;

an act of the first node determining that a first portion of the first table stored at the first node and a first portion of the second table stored at the first node are join incompatible;

an act of the first node sending first replicated column values from the join attribute column to the second node, the first replicated column values selected from the first portion of the first table in accordance with the second query term;

an act of the first node receiving second replicated column values from the join attribute column from the second node, the second replicated column values selected from a second portion of the first table stored at the second node in accordance with the second query term;

an act of the first node combining the first replicated column values and the second replicated column values into combined replicated column values to create a filter for the second table, the combined replicated column values containing both the first replicated column values and the second replicated column values;

an act of the first node using the filter for joining the combined replicated column values with rows from the first portion of the second table to select rows from the second table that satisfy the first query term;

an act of the first node moving one or more of the selected rows to the second node for join compatibility with the second portion of the first table and retaining one or more of the selected rows at the first node;

an act of the first node receiving one or more further selected rows from the second node for join compatibility with the first portion of the first table, the one or more further selected rows selected from the second portion of the second table;

an act of the first node combining the one or more retained selected rows from the first portion of the second table with the one or more further selected rows from the second portion of the second table into combined selected rows that are join compatible with the first portion of the first table; and an act of joining the combined selected rows from the first and second portions of the second table with the first portion of the first table to partially satisfy the query.

2. The system as recited in claim 1, wherein the act of receiving a query comprises an act of receiving a SQL query.

3. The system as recited in claim 1, wherein the act of building a filter comprises an act of using a replication primitive to copy values from a plurality of fragments of the first table into a replicated table.

4. The system as recited in claim 1, wherein the act of building a filter comprise an act of using a DISTINCT primitive to eliminate duplicate values.

5. The system as recited in claim 1, wherein a column in the second table is the join attribute column.

6. A computing system comprising:
at least one processor; and one or more computer storage device storing computer-executable instructions which, when executed by the one or more processors, implement a method for performing a query over first and second tables in a distributed database system, wherein the first and second tables having a join attribute column, and wherein the distributed database system includes a first node and a second node, the first node and second node each storing a portion of the first table and a portion of the second table such that the first and second tables are distributed across the first and second nodes, the method including:

an act of receiving a query for joining together selected items from the first table with selected items from the second table, the query including a first query term and a second query term, the first query term for selecting corresponding rows from the first and second tables that have a specified relationship based on values in the join attribute column, the second query term for filtering rows based on column values in a second column of the first table;

an act of the first node determining that a first portion of the first table stored at the first node and a first portion of the second table stored at the first node are join incompatible;

an act of the first node sending first replicated column values from the join attribute column to the second node, the first replicated column values selected from the first portion of the first table in accordance with the second query term;

an act of the first node receiving second replicated column values from the join attribute column from the second node, the second replicated column values selected from a second portion of the first table stored at the second node in accordance with the second query term;

an act of the first node combining the first replicated column values and the second replicated column values into combined replicated column values to create a filter for the second table, the combined replicated column values containing both the first replicated column values and the second replicated column values;

an act of the first node using the filter for joining the combined replicated column values with rows from the first portion of the second table to select rows from the second table that satisfy the first query term;

an act of the first node moving one or more of the selected rows to the second node for join compatibility with the second portion of the first table and retaining one or more of the selected rows at the first node;

an act of the first node receiving one or more further selected rows from the second node for join compatibility with the first portion of the first table, the one or more further selected rows selected from the second portion of the second table;

an act of the first node combining the one or more retained selected rows from the first portion of the second table with the one or more further selected rows from the second portion of the second table into combined selected rows that are join compatible with the first portion of the first table; and an act of joining the combined selected rows from the first and second portions of the second table with the first portion of the first table to partially satisfy the query.

7. The computer storage device as recited in claim 6, wherein the query is a SQL query.

8. The computer storage device as recited in claim 6, wherein the method includes the distributed database system using a replication primitive to copy values from a plurality of fragments of the first table into a replicated table.

9. The computer storage device as recited in claim 6, wherein the method includes the distributed database system using a DISTINCT primitive to eliminate duplicate values.

10. The computer storage device as recited in claim 6, wherein a column in the second table is the join attribute column.

11. In a distributed database system, the distributed database system storing a first table and a second table, the first and second tables having a join attribute column, the distributed database system including a first node and a second node, the first node and second node each storing a portion of the first table and a portion of the second table such that the first and second tables are distributed across the first and second nodes, a method for performing a query over the first and second tables, the method comprising:

an act of receiving a query for joining together selected items from the first table with selected items from the second table, the query including a first query term and a second query term, the first query term for selecting corresponding rows from the first and second tables that have a specified relationship based on values in the join attribute column, the second query term for filtering rows based on column values in a second column of the first table;

an act of the first node determining that a first portion of the first table stored at the first node and a first portion of the second table stored at the first node are join incompatible;

an act of the first node sending first replicated column values from the join attribute column to the second node, the first replicated column values selected from the first portion of the first table in accordance with the second query term;

an act of the first node receiving second replicated column values from the join attribute column from the second node, the second replicated column values selected from a second portion of the first table stored at the second node in accordance with the second query term;

an act of the first node combining the first replicated column values and the second replicated column values into combined replicated column values to create a filter for the second table, the combined replicated column values containing both the first replicated column values and the second replicated column values;

an act of the first node using the filter for joining the combined replicated column values with rows from the first portion of the second table to select rows from the second table that satisfy the first query term;

an act of the first node moving one or more of the selected rows to the second node for join compatibility with the second portion of the first table and retaining one or more of the selected rows at the first node;

an act of the first node receiving one or more further selected rows from the second node for join compatibility with the first portion of the first table, the one or more further selected rows selected from the second portion of the second table;

an act of the first node combining the one or more retained selected rows from the first portion of the second table with the one or more further selected rows from the second portion of the second table into combined selected rows that are join compatible with the first portion of the first table; and an act of joining the combined selected rows from the first and second portions of the second table with the first portion of the first table to partially satisfy the query.

12. The method as recited in claim 11, further comprising:
an act of the second node determining that the second portion of the first table and a second portion of the second table are join incompatible; and
an act of the second node sending the second replicated column values from the join attribute column to the first node, the second replicated column values selected from the second portion of the first table in accordance with the second query term.

13. The method as recited in claim 12, further comprising an act of the second node receiving the first replicated column values from the first node.

14. The method as recited in claim 13, further comprising an act of the second node combining the first replicated column values and the second replicated column values into the combined replicated column values.

15. The method as recited in claim 14, further comprising an act of the second node joining the combined replicated column values with rows from the second portion of the second table to select rows from the second table that satisfy the first query term.

16. The method as recited in claim 15, further comprising:
an act of the second node moving the one or more further selected rows to the first node for join compatibility with the first portion of the first table and retaining one or more other of the selected rows at the second node; and
an act of the second node receiving the one or more rows from the first node for join compatibility with the second portion of the first table.

17. The method as recited in claim 16, further comprising:
an act of the second node combining the one or more other retained selected rows with the one or more rows into additional combined selected rows that are join compatible with the second portion of the first table; and
an act of joining the additional combined selected rows with the second portion of the first table to partially satisfy the query.

18. The method as recited in claim 11, wherein the act of receiving a query for joining together selected items from the first table with selected items from the second table comprises an act of receiving a SQL query.

19. The method as recited in claim 11, wherein the act of the first node sending first replicated column values from the join attribute column to the second node comprises an act of using a replication primitive to copy the first replicated column values into a replicated table.

20. The method as recited in claim 11, further comprising prior to sending the first replicated values an act of using a DISTINCT primitive to eliminate duplicate values from the first replicated values.

* * * * *